Aug. 26, 1958 L. R. CRUMP 2,848,748
METHOD OF SECURING PERMANENT THREE-DIMENSIONAL
PATTERNS OF MAGNETIC FIELDS
Filed Feb. 28, 1956
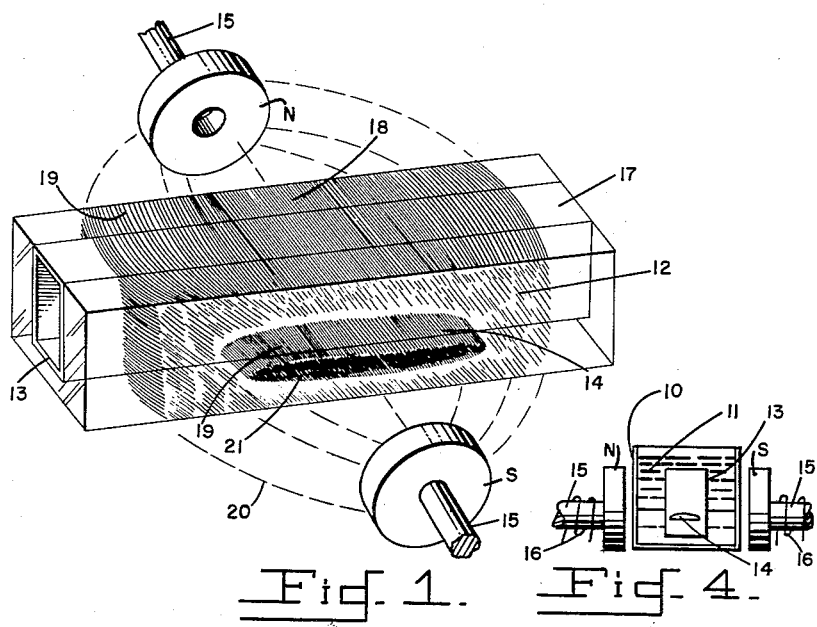
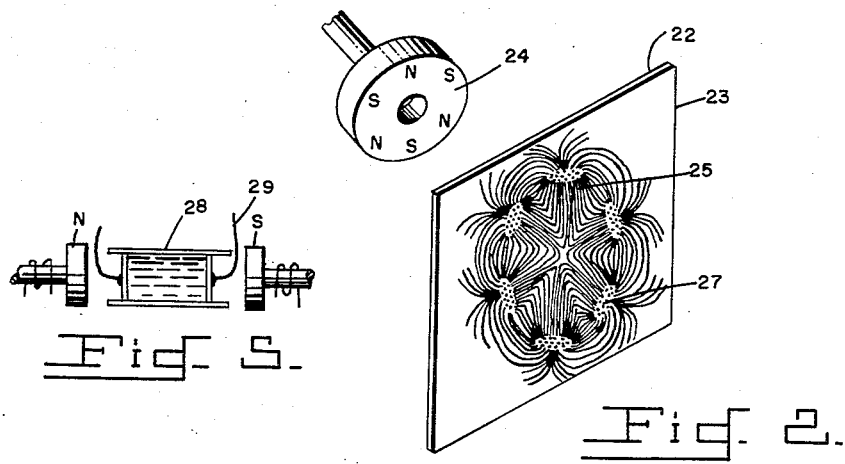
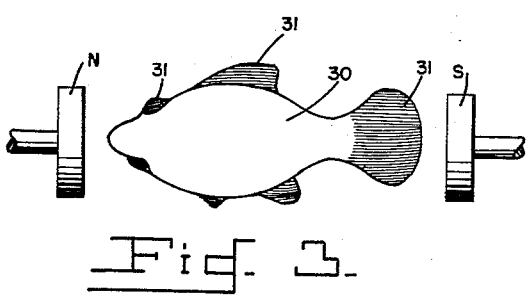
INVENTOR
*Lloyd R. Crump*

United States Patent Office 2,848,748
Patented Aug. 26, 1958

2,848,748

METHOD OF SECURING PERMANENT THREE-DIMENSIONAL PATTERNS OF MAGNETIC FIELDS

Lloyd R. Crump, Silver Spring, Md.

Application February 28, 1956, Serial No. 568,316

3 Claims. (Cl. 18—47.5)

This invention relates to a method of securing a permanent record of a three-dimensional magnetic field.

It is an important object of this invention to secure a permanent three-dimensional record of a magnetic field.

Length, breadth and depth of the magnetic field are shown by iron filings of microscopic size in a transparent thermosetting plastic, the plastic hardening so as to produce a permanent record of the field studied.

The microscopic iron particles are in suspension. A very weak magnetic field can be studied since very little magnetic force is required to align the particles so as to show the distribution of the magnetic field in the specimen being observed.

The hardened specimen of plastic which contains the iron particles defining the magnetic field distribution may be cut into thin layers or slices so that the magnetic field at each point may be examined under a microscope or other magnifying means without any risk of displacing the particles.

The effects of distortion of a magnetic field from a specimen by a disturbing influence can be readily observed.

The field resulting from current in various arrangements of conductors can be observed and a permanent record obtained.

The leakage field around toroid coils can be observed and leakage fields can be discovered around objects which are magnetically shielded even though this leakage field is very weak.

The iron particles may be plated with metal by plating in a submersion process and these plated particles may be applied to objects under the influence of a magnetizing force to enhance the appearance of the objects.

The iron particles may be placed in suitable containers and the particles made to line up under the influence of a magnetizing force to provide resistors of a desired resistance.

Magnetic cores may also be formed by a similar method and they may also be initially saturated in a certain direction or otherwise left in a desired initial state, and the cores may be formed in rings and in other shapes.

In the drawings:

Figure 1 is a perspective view of a solid body of plastic and showing the three-dimensional magnetic field mapped out by the iron filings.

Figure 2 is a perspective view of the liquid and its iron filings held between a pair of glass plates and magnetized by a portion of a magnetic clutch.

Figure 3 is a side view of a glass fish spotted with the plastic liquid which contains plated iron particles.

Figure 4 is a view through a container holding the plastic liquid with its iron particles in suspension therein and with a specimen in a brass tube to be magnetized by magnetizing bars shown in plan.

Figure 5 is a side view of a container containing the plastic liquid and its particles in suspension to provide a resistor or to provide a magnetic core.

Figure 4 shows the means for obtaining the specimen shown in perspective in Figure 1. A glass jar 10, or the like, contains a liquid plastic indicated generally at 11, and this liquid contains iron powder of microscopic size in suspension.

The liquid plastic contains a catalyst so that the liquid may set without undue delay, and while the magnetizing force is maintained, and so that the liquid may assume a solid state after a period of time.

A brass tube 13 is placed in the liquid, and in one use of the invention there was a core 14 of ferrite suitably placed in the tube. This ferrite core was magnetized by two iron bars 15, magnetized by current through coils 16, and with the bars disposed one on each side of the container and facing the core.

The result is shown in Figure 1, in which 17 identifies the solid plastic and 13 the brass tube. The top of the plastic was cut away so that there is only a thin layer of the plastic over the tube and this was done so that the field is shown by the parallel lines 18. The lines through the ferrite core and immediately above it are also shown in parallel at 19, and they are shown as bending beyond the ferrite to follow the magnetizing force from the bars 15, which is generally indicated by the hatched lines 20.

The solid plastic may be cut into thin strips or slides for viewing under a microscope or other magnifying means so that the shape of the field at any point may be carefully studied. This is of particular importance when the object studied is one that contains an internal magnetizing force which is shielded so that there should be little, if any, external magnetic field, but if there is a weak external field the particles will show it for it requires only a very weak magnetizing force to move the particles since they are in suspension in the liquid.

The field about carefully designed toroids and the field about various shapes of magnetic elements may obviously be shown by the particles, and slides may be made of portions of the magnetic flux distribution to determine the flux density at different parts of the object studied.

One very unusual feature of this invention is that when we look at the end of the ferrite core we can see the pole set up in the core as indicated at 21 in Figure 1. The magnetic lines repel each other as they pass in parallel through the ferrite, and light can pass through the plastic between the lines.

This can also be seen in the example used in Figure 2, in which a drop of the plastic liquid containing the iron filings in suspension, and the catalyst, was dropped on a plate 22 of glass, and then another glass plate 23 was laid over the drop to spread it over the opposed surfaces of the two plates, and then an element of a magnetic clutch, identified at 24, was brought near to the glass plates, and the particles gave the field pattern shown and identified generally by the numeral 25. It will be observed that there are six spots 27, corresponding to the six poles of the clutch element, through which the magnetic lines are in parallel and spaced apart enough so that light can pass between them to give the appearance of relatively bright spots. The lines bend away from the poles to give the appearance shown. Beyond the strong influence of the magnetizing force the particles take on no determined pattern.

The liquid plastic used in obtaining the specimens of Figures 1 and 2 was a thermosetting plastic liquid known under the trade name of Selectron No. 5003, and supplied by the Pittsburgh Plate Glass Co. Other transparent thermosetting plastic may be employed.

The liquid is poured into a jar, such as a jam jar, and much as we would pour molasses into a jar to avoid air bubbles. Then around 1% of the weight of the plastic liquid is weighed out in the iron particles, and is dropped on top of the liquid. Glass marbles are placed in the liquid, the cover is placed on the jar, and the jar is barrel-rolled to put the particles in suspension in the plastic and to avoid creating air bubbles in the liquid. The amount of iron particles used depends upon just how dense an accumulation of particles is wanted in showing the flux distribution, and more or less than the 1% stated may be used.

When fairly large quantities of the liquid have to be used about a specimen to be examined, it has been found acceptable to stir the liquid and the iron particles with a stick to cause the particles to go into suspension, and to work out any air bubbles with the stick. This, of course, is an old expedient in the laboratory to produce the suspension of the particles without having air bubbles.

If the liquid containing the iron particles in suspension is to be used almost immediately, then a catalyst can be added to the plastic liquid. It can be worked into the liquid by the barrel-rolling method or simply by stirring. The catalyst used in producing the specimens of Figures 1 and 3 was 60% methyl ethyl ketone peroxide and 40% dimethyl phthalate. This can be bought ready made. From two tenths to five tenths percent of the weight of the liquid plastic is weighed out in the catalyst and is added to the liquid plastic. The catalyst causes the liquid plastic to first set and hold the iron particles immobile while the magnetizing force is maintained on the particles, and after the liquid has set it will next assume the state of a solid body. How much of the catalyst is used depends upon how fast it is desired that the liquid will set and become a solid body. However, the proportions herein have been satisfactory.

In the arrangement shown in Figure 2 the plastic will set in about 20 minutes and will finally become a solid in about 2 hours. The plastic will set faster and will harden in less time if exposed to a temperature of from around 70 to 120 degrees. Overheating will cause it to show cracks.

In the arrangement shown in Figure 2, a 150 watt lamp was brought within about a foot from the glass plates for a very brief period of time, and the plastic set so that the particles became immobile and the magnetizing force could be removed.

In the example shown in Figure 5, resistors can be readily made by filling a tube 28 with a liquid plastic having the particles in suspension and having the catalyst; the ends of the tube are sealed and wires 29 are connected to the metallic seals or pushed through the seals if they are of a non-conducting material, and the particles are compelled to align themselves along the tube under the influence of a magnetizing force. The liquid is allowed to harden to a solid.

The same method may be used to form cores of magnetic material of different shapes.

In the example shown in Figure 3, a glass body having the outline of a fish 30 is spotted with the iron containing plastic liquid as is indicated at 31. When a magnetizing force is applied the particles assume straight lines and become permanent when the liquid changes to a solid. The particles are copper plated by immersion plating. They are dropped into a saturated solution of copper sulphate, and when the iron has taken on a coating of copper a magnet pulls all of the filings to the bottom of the container containing the solution, the copper sulphate is then poured off, and acetone is poured into the container. The acetone is a drying agent, and soon the copper plated particles are ready for immersion and for being suspended in the liquid plastic. The fish body shows portions which are apparently plated with copper.

I claim:
1. The method of securing a permanent, visible, three-dimensional pattern of the magnetic field existing in a predetermined zone, said method comprising the steps of: adding microscopic magnetic-responsive particles to a substantially transparent thermosetting plastic liquid held in a suitable container, causing said particles to become suspended in the liquid, adding a catalyst to the liquid which will cause the liquid to set and then solidify after a period of time, placing said container in said predetermined zone after adding said catalyst and before the liquid has set, the magnetic field existing in said predetermined zone causing said particles to align in conformance therewith, allowing the liquid to set while under the influence of said magnetic field, and thereafter allowing the set liquid to assume the state of a solid body, the amount of said particles by weight added to the liquid in said container being substantially smaller than the weight of the liquid so that the three-dimensional arrangement of said particles in the resulting solid can be observed.

2. The method of securing a permanent, visible, three-dimensional pattern of the magnetic field existing in the vicinity of a magnetic specimen, said method comprising the steps of: adding microscopic magnetic-responsive particles to a substantially transparent thermosetting plastic liquid held in a suitable container, causing said particles to become suspended in the liquid, adding a catalyst to the liquid which will cause the liquid to set and solidify after a period of time, immersing said specimen in the liquid after said catalyst has been added and before the liquid has set, the magnetic field in the vicinity of said specimen causing said particles to align in conformance therewith, allowing the liquid to set and solidify while said specimen is immersed therein, the amount of said particles by weight added to the liquid in said container being substantially smaller than the weight of the liquid so that the three-dimensional arrangement of said particles in the resulting solid can be observed.

3. The method of securing a permanent, visible three-dimensional pattern of a section of a magnetic field, said method comprising the steps of: adding microscopic magnetic-responsive particles to a substantially transparent thermosetting plastic liquid held in a suitable container, causing said particles to become suspended in the liquid, adding a catalyst to the liquid which will cause the liquid to set and then solidify after a period of time, placing a drop of the liquid upon a first transparent plate after said catalyst has been added and before the liquid has set, placing a second transparent plate over the drop parallel and in contact with the first plate so as to permit the liquid to spread over the opposing surfaces of the two plates, placing the two plates in the magnetic field at the desired section, the magnetic field causing the particles in the liquid between the plates to align in conformance therewith, allowing the liquid between the plates to set while at the desired section in the magnetic field, and thereafter allowing the set liquid to solidify, the amount of said particles by weight added to the liquid in said container being substantially smaller than the weight of the liquid so that the arrangement of the particles between the plates after solidification can be observed.

References Cited in the file of this patent

UNITED STATES PATENTS

| | | |
|---|---|---|
| 1,930,788 | Buckner | Oct. 17, 1933 |
| 2,064,773 | Vogt | Dec. 15, 1936 |
| 2,188,091 | Baermann | Jan. 23, 1940 |
| 2,444,729 | Crockwell | July 6, 1948 |